(12) United States Patent
Proietti et al.

(10) Patent No.: US 8,903,424 B2
(45) Date of Patent: *Dec. 2, 2014

(54) SYSTEM AND METHOD FOR DYNAMICALLY MONITORING STATUS IN LOCATION SERVICES

(71) Applicant: Technocom Corporation, Carlsbad, CA (US)

(72) Inventors: Mario Proietti, Fullerton, CA (US); John Thomas Moring, Encinitas, CA (US); Brenda C. Schafer, Carlsbad, CA (US)

(73) Assignee: Technocom Corporation, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/260,112

(22) Filed: Apr. 23, 2014

(65) Prior Publication Data

US 2014/0235268 A1   Aug. 21, 2014

Related U.S. Application Data

(63) Continuation of application No. 13/028,060, filed on Feb. 15, 2011, now Pat. No. 8,755,823.

(51) Int. Cl.
*H04W 24/00* (2009.01)
*H04W 4/02* (2009.01)

(52) U.S. Cl.
CPC ..................................... *H04W 4/02* (2013.01)
USPC ................. 455/456.2; 455/414.1; 340/539.13

(58) Field of Classification Search
USPC ............. 455/456.1–456.5, 414.1; 340/539.13
See application file for complete search history.

(56) References Cited

U.S. PATENT DOCUMENTS

| | | | |
|---|---|---|---|
| 6,363,323 B1 | 3/2002 | Jones | |
| 6,591,112 B1 | 7/2003 | Siccardo et al. | |
| 7,133,663 B2 | 11/2006 | Fano et al. | |
| 7,133,909 B2 | 11/2006 | Bahl | |
| 2001/0004600 A1 | 6/2001 | Son et al. | |
| 2003/0078053 A1 | 4/2003 | Abtin et al. | |
| 2004/0127229 A1 | 7/2004 | Ishii | |
| 2005/0032532 A1 | 2/2005 | Kokkonen et al. | |
| 2005/0085257 A1 | 4/2005 | Laird et al. | |
| 2005/0143096 A1 | 6/2005 | Boesch | |
| 2006/0046744 A1 | 3/2006 | Dublish et al. | |
| 2006/0055528 A1 | 3/2006 | Akamatsu | |
| 2007/0159322 A1 | 7/2007 | Garratt Campbell | |
| 2007/0178908 A1 | 8/2007 | Doyle | |
| 2007/0182546 A1 | 8/2007 | Virk et al. | |
| 2007/0194938 A1 | 8/2007 | Mitchell | |
| 2007/0287428 A1 | 12/2007 | Diacakis et al. | |
| 2010/0255856 A1 | 10/2010 | Kansal et al. | |
| 2012/0276927 A1 | 11/2012 | Pitt | |

OTHER PUBLICATIONS

SPRINT, "Workforce Locator 6.1, User's Guide"; Feb. 2011, 31 pp.

*Primary Examiner* — Charles Shedrick
(74) *Attorney, Agent, or Firm* — Christie, Parker & Hale, LLP

(57) ABSTRACT

A method and system for reporting a location of an asset. The method includes: receiving a location tracking request for the asset; dynamically determining a status of the asset; and allowing acquisition of the location of the asset based on the determined status. The method further includes: obtaining the location of the asset responsive to the received request and said allowing; and reporting the obtained location of the asset. The system includes: a reporting module for receiving a location tracking request for the asset; a status module for dynamically determining a status of the asset; and a tracking module for obtaining the location of the asset responsive to the determined status. The reporting module reports the location of the asset responsive to the received location tracking request.

21 Claims, 4 Drawing Sheets

| Active | |
|---|---|
| | X |
| Time Restriction | Start time (HH:MM:SS): 08 : 00 : 00<br>End time (HH:MM:SS): 17 : 00 : 00 |
| Days: | M [X]  Tu [X]  W [X]  Th [X]  F [X]  Sa [ ]  Su [ ] |

FIG. 2 (PRIOR ART)

SYSTEM AND METHOD FOR DYNAMICALLY MONITORING STATUS IN LOCATION SERVICES

CROSS-REFERENCE TO RELATED APPLICATIONS

This application is a continuation of U.S. patent application Ser. No. 13/028,060, filed on Feb. 15, 2011, the entire contents of which are hereby incorporated by reference.

FIELD OF INVENTION

The present invention relates to the field of location based services, and more specifically to a system and method for dynamically monitoring status in location services.

BACKGROUND

Radiolocation of mobile devices developed in the last half of the $20^{th}$ century, notably with the deployment of the Global Positioning System (GPS). Mobile phone technology evolved in a similar time frame. By the turn of the century, US cellular carriers deployed location-determination technology in their networks in support of emergency (E9-1-1) services. Subsequently, with the widespread use of smart phones and other portable computing devices, numerous applications utilizing location have been made available for such uses as direction finding, tracking individuals, and matching persons with nearby businesses.

Traditionally, a company might monitor its resources, e.g., vehicles, through an expensive specialized tracking system. With location technology being integrated into employees' personal communication equipment (cell phones), the specialized tracking systems may no longer be needed. The employer can track the employees via their cell phones. However, it may be necessary or appropriate for the employer to only track the employee during work hours. A simple "9-to-5, Monday-through-Friday," tracking limitation is not suitable for many workers who may have flexible hours, employees on vacation, etc.

The present invention solves this problem by enabling and disabling location tracking or reporting thereof, based on a dynamically monitored status, for example, when an employee is on the job and when the employee is on his or her own time.

SUMMARY

In some embodiments, the present invention is a method for reporting a location of an asset. The method includes: receiving a location tracking request for the asset; dynamically determining a status of the asset; and allowing acquisition of the location of the asset based on the determined status. The method further includes: obtaining the location of the asset responsive to the received request and said allowing; and reporting the obtained location of the asset.

In some embodiments, the present invention is a system for reporting a location of an asset. The system includes: a reporting module for receiving a location tracking request for the asset; a status module for dynamically determining a status of the asset; and a tracking module for obtaining the location of the asset responsive to the determined status. The reporting module reports the location of the asset responsive to the received location tracking request.

In some embodiments, the present invention is a method for reporting a location of an asset. The method includes: receiving a first indication of a current state of the person, the current state being one of a plurality of predefined states, wherein the first indication is triggered by a first action of the person; storing information about the current state; determining a first permission based on the information about the current state, the first permission indicating a first level of allowed location reporting; and reporting the location of the person based on the first permission. The method may further include receiving a second indication of an updated current state of the person, the updated current state being one of the plurality of predefined states, wherein the second indication is triggered by a second action of the person; storing information about the updated current state; determining a second permission based on the information about the updated current state, the second permission indicating a second level of allowed location reporting; and reporting the location of the person based on the second permission.

BRIEF DESCRIPTION OF THE DRAWINGS

FIG. 2 shows a form for entering tracking times, according to the prior art.

DETAILED DESCRIPTION

In some embodiments, the present invention enables and/or disables location tracking of an asset or resource, or reporting thereof, based on a dynamically monitored status, for example, when an employee is on the job and/or when the employee is on his or her own time.

Figure 1:
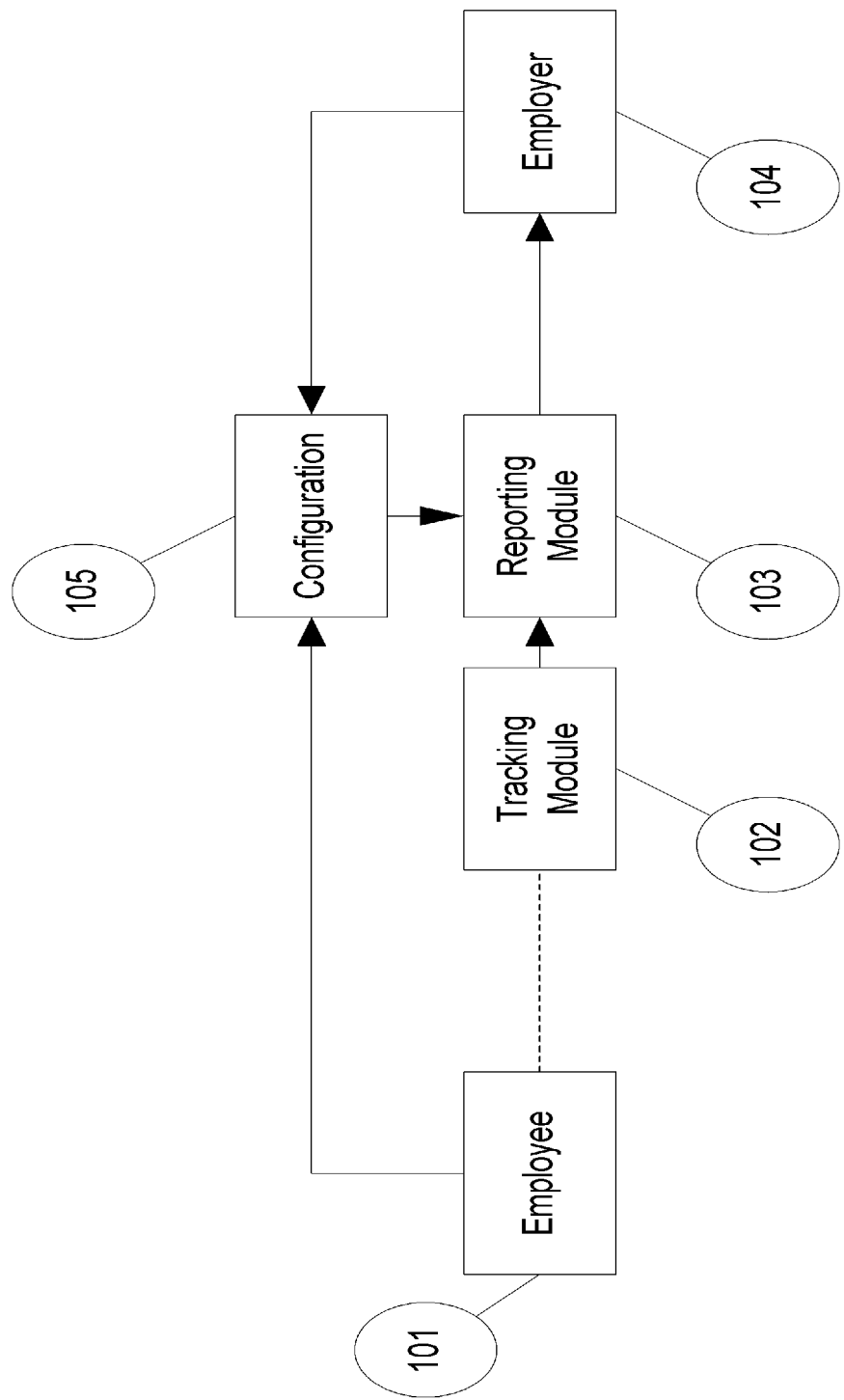
FIG. 1 shows a system diagram for tracking an employee, according to the prior art.

FIG. 1 illustrates an exemplary functional block diagram of a typical employee tracking system, according to the prior art. Data flows are indicated by arrowed lines. An employee 101 is monitored by a tracking module 102. The dotted line indicates a location determination, e.g., using the cellular network. The tracking module provides employee locations to a reporting module 103, which in turn make the locations available to an employer 104. An example of this is a cell phone tracking feature provided by a cellular carrier. In this example, the employer pays for the employee cell phone usage, and in turn has permission to monitor employee location while the employee is working. The details are controlled by a configuration module 105, which has information entered by the employer and possibly the employee. Configuration typically includes information such as employee name, mobile device identification, times for employee to be tracked, boundary areas for alerts, etc. The employee may or may not have access to aspects of the configuration.

FIG. 2 illustrates an example of a form used to enter some of the configuration information, according to the prior art. For a given account, the tracking can be made active (allowed) or inactive (disallowed) in the first line. In the second line, the hours of tracking are entered, here from 8 AM to 5 PM. In the third line, the days of tracking are entered, here weekdays only. Such a system does not easily account for such eventualities as the employee taking a sick day, or working a Saturday in place of a Friday, or employees with flexible schedules.

Figure 3:
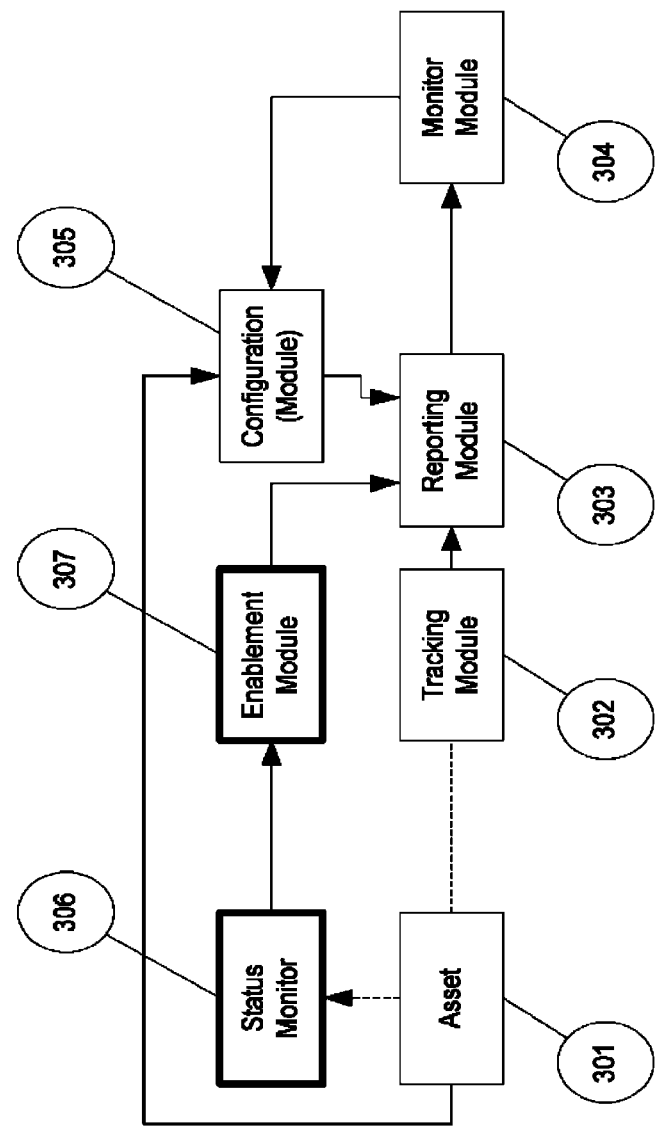
FIG. 3 shows an exemplary system diagram for tracking an asset, according to some embodiments of the present invention.

FIG. 3 shows an exemplary system diagram for tracking an asset, according to some embodiments of the present invention. The illustrated system may be applied to a more general set of tracked assets, beyond employees. An asset 301 is monitored by a tracking module 302. The tracking module provides the asset locations to a reporting module 303. The reporting module 303 reports the locations of the asset, based on conditions set by a user.

The reporting module 303 provides location of the asset or resource 301 to the monitor module 304, under control of a configuration (module) 305. The configuration includes information such as asset name, mobile device identification, boundary areas for alerts, etc. The times for asset to be tracked are supplemented or replaced by the combination of the status monitor module 306 and enablement module 307. The status monitor module, described in more detail below, determines the state of the asset at any given time. Based on the status, the enablement module 307 determines whether tracking is permitted and indicates to the reporting module whether location information may be delivered. Obtaining the location of the asset may depend on the configuration. Reporting the location of the asset may also depend on the enablement module, as well as the configuration.

In some embodiments, the status monitor module keeps track of the asset's status, for example, as a binary state: either "at work"/"on the clock" (allowing the asset to be tracked) or "off work"/"off the clock" (preventing the asset from being tracked). This may be implemented any number of ways. In some embodiments, the invention uses a device based on a traditional time clock, where employees (physically) clock in and clock out when arriving at, and leaving work. For people or assets that do not report to a central location each day, other methods, such as sending a text message or email, making a phone call, or logging in to a web portal may be available.

In some embodiments, the status monitor module has more complex permission states. A third state could indicate a person's or an asset's eligibility for tracking only with a positive response to an explicit request for permission to be located. So, in this case while a user has given permission to be located during a particular period of time, their consent may be granted by the user on a case-by-case basis based on the requestor of the location or their current status during the authorized timeframe, but automatically denied if outside the authorized timeframe.

In some embodiments, other sets of states allow the person or the asset to be tracked with varying degrees of accuracy depending on the location of the asset or the time of the location request. For example the person or the asset may be tracked by exact location while on the clock, tracked by neighborhood on lunch hour, and not tracked at all on the weekend. Also, the varying degrees of tracking accuracy might be determined by privacy concerns or cost, where less exact locations may be less expensive. A long haul delivery vehicle might need only the less expense/less accurate tracking while on the open road, but require more precise tracking near the terminus points.

The following examples show how a variety of trigger events can be used to set tracking status. A tracking status may be assigned to a person or vehicle entering a sensitive area such as a military base; a person or vehicle leaving a known area, such as a school or worksite; an emergency vehicle with its lights/siren engaged; a vehicle traveling at an excessive speed; and/or a container loaded onto a ship, which would not need to be tracked individually until later when it is unloaded from the ship.

The enablement module 307, which in some embodiments may not be distinct from the status monitor module, indicates the person or asset tracking permission to the reporting module. When not enabled, the reporting module 303 prevents location information from being delivered to the status monitor module, thus protecting the asset's privacy during non-work hours. However, depending on permissions, the reporting module could be configured to provide a person's location to other requestors, as in a family location scenario, regardless of the person's "at work" status.

Figure 4:
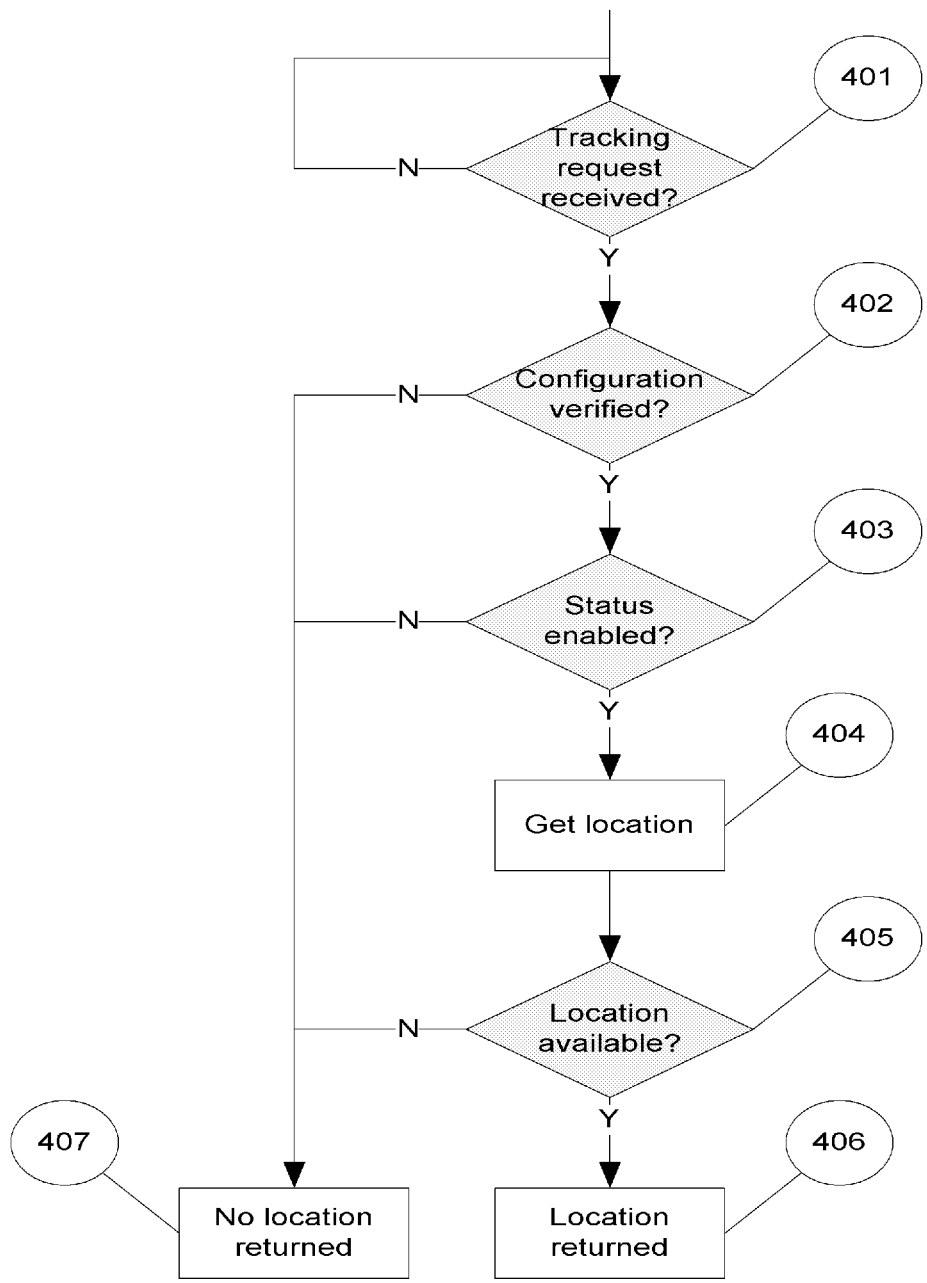
FIG. 4 shows an exemplary logical flow of a reporting module, according to some embodiments of the present invention.

FIG. 4 shows an exemplary logical flow of a reporting module, according to some embodiments of the present invention. As shown, the reporting module waits for a tracking request to be received 401, for example, from a status monitor module. When a request is received, the configuration is optionally checked 402, for example, to verify the status monitor module's credentials, verify the identity of the tracked person or asset, etc. If the configuration verification fails, no location is returned 407. If the configuration verification is successful, a status enablement check is performed 403. In this process, the enablement state determined by the status monitor module and enablement module is checked to see if tracking is currently allowed, and any associated constraints (e.g., low precision tracking only). If tracking is not allowed, no location is returned 407.

If tracking is allowed, then an attempt is made to locate the asset 405 via the tracking module. If the location is not available 405, no location is returned. If the location is available 405, the location is returned 406. The allowance of the tracking may be stored for a next tracking request of the person or the asset.

In some embodiments, a first indication of a current state of the person is received, the current state being one of a plurality of predefined states (e.g., "at work," "off work"). The first indication is triggered by a first action of the person, such as clocking in to work as described earlier. The information about the current state ("at work" in this example) is then stored. Subsequently, a first permission is determined based on the information about the current state, the first permission indicating a first level of allowed location reporting (e.g., "full tracking allowed"). The location of the person is then reported based on the first permission. Later, a second indication of an updated current state of the person may be received, as when the person clock out of work. The updated current state ("off work") is also one of the predefined states, and is also triggered by a second action of the person. The information about the updated current state is then stored, and a second permission is determined based on the information about the updated current state, the second permission indicating a second level of allowed location reporting (e.g., "no tracking allowed"). The location of the person is reported again, or in this example, denied, this time, based on the second permission.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope of the invention, as defined by the appended claims.

What is claimed is:

1. A method for reporting a location of an asset, the method comprising:
   receiving, by a processor, a location tracking request to obtain a current location of the asset;
   providing configuration information for the asset;

dynamically determining a status of the asset, responsive to the received request, and based on movement of the asset and the configuration information for the asset;
providing permission for access to the current location of the asset, based on the determined status of the asset;
tracking the asset with varying tracking precision depending on the determined status of the asset, which is based on the movement of the asset and the configuration information for the asset;
obtaining the current location of the asset, responsive to said permission; and
generating a report for the obtained current location of the asset, wherein a precision of said report for the obtained current location of the asset is based on the determined status of the asset, which is based on the movement of the asset and the configuration information for the asset, wherein the method is performed by one or more processors.

2. The method of claim 1, wherein the asset is a vehicle.

3. The method of claim 2, wherein the configuration information for the vehicle includes one or more of an asset name, the vehicle being an emergency vehicle with its lights/siren engaged, the vehicle traveling at an excessive speed, and boundary areas for reporting.

4. The method of claim 1, wherein the asset is a container.

5. The method of claim 4, wherein the configuration information for the container includes one or more of whether the container is loaded onto carrier, whether the container to be tracked individually, and boundary areas for reporting.

6. The method of claim 1, further comprising storing said permission for access to the current location for a next tracking request of the location of said asset.

7. The method of claim 1, further comprising verifying the configuration information for the asset and obtaining the location of the asset according to the verified configuration information.

8. The method of claim 1, wherein the status of the asset includes varying degrees of location accuracy to be reported based on the location of the asset.

9. The method of claim 1, wherein the status of the asset includes varying degrees of location accuracy to be reported based on the time of the location tracking request.

10. The method of claim 9, wherein the varying degrees of location accuracy are determined based on privacy or cost factors.

11. A system for reporting a location of an asset comprising:
a reporting module including a first processor, which includes computer executable instructions for receiving a location tracking request to obtain a current location of the asset;
a configuration module including a second processor, which includes computer executable instructions for providing configuration information for the asset;
a status module including a third processor, which includes computer executable instructions for dynamically determining a status of the asset, responsive to the received request, movement of the asset and the configuration information;
an enablement module including a fourth processor, which includes computer executable instructions for providing permission for acquisition of the current location of the asset, based on the determined status of the asset; and
a tracking module including a fifth processor, which includes computer executable instructions for tracking location of the asset with varying tracking precision depending on the determined status of the asset, and obtaining the current location of the asset with a precision determined by the status of the asset, responsive to said permission, wherein the reporting module reports the obtained location of the asset.

12. The system of claim 11, wherein the tracking module obtains the current location of the asset after the determined status indicates that the tracking module is allowed to obtain said location.

13. The system of claim 11, wherein the configuration module is configured to verify a configuration for the asset, and wherein the tracking module obtains the current location of the asset based on the verified configuration.

14. The system of claim 11, wherein the status of the asset includes varying degrees of location accuracy to be reported by the reporting module, based on at least the time of the location tracking request, privacy or cost factors.

15. The system of claim 11, wherein the asset is a vehicle.

16. The system of claim 15, wherein the configuration information for the vehicle includes one or more of an asset name, the vehicle being an emergency vehicle with its lights/siren engaged, the vehicle traveling at an excessive speed, and boundary areas for reporting.

17. The system of claim 11, wherein the asset is a container.

18. The system of claim 17, wherein the configuration information for the container includes one or more of whether the container is loaded onto carrier, whether the container to be tracked individually, and boundary areas for reporting.

19. A method for reporting a location of an asset, the method comprising:
receiving a first indication of a current state of the asset, the current state of the asset being one of a plurality of predefined states in a configuration information data record for the asset, wherein the first indication is triggered by a first movement of the asset;
determining information about the current state of the asset based on the first indication triggered by said first movement of the asset and said configuration information;
storing said information about the current state; and
determining a first permission for reporting the location of the asset, based on the information about the current state, the first permission indicating a precision level of tracking the asset and allowed location reporting, wherein said level of tracking the asset is based on movement of the asset and the configuration information data record for the asset, wherein the method is performed by one or more processors.

20. The method of claim 19, further comprising:
receiving a second indication of an updated current state of the asset, the updated current state being one of the plurality of predefined states, wherein the second indication is triggered by a second movement of the asset;
storing information about the updated current state; and
determining a second permission for reporting the location of the asset, based on the information about the updated current state, the second permission indicating a second level of allowed location reporting.

21. The method of claim 20, wherein the asset is a vehicle or a container.

* * * * *